(12) United States Patent
Fang

(10) Patent No.: US 10,407,239 B2
(45) Date of Patent: Sep. 10, 2019

(54) FIXING CLAMP FOR DISCHARGE OUTLET OF INTERMEDIATE BULK CONTAINER

(71) Applicant: SHANGHAI HONGYAN RETURNABLE TRANSIT PACKAGINGS CO., LTD., Shanghai (CN)

(72) Inventor: Zhengwei Fang, Shanghai (CN)

(73) Assignee: HONGYAN RETURNABLE TRANSIT PACKAGINGS CO., LTD, Shanghai (CN)

(*) Notice: Subject to any disclaimer, the term of this patent is extended or adjusted under 35 U.S.C. 154(b) by 255 days.

(21) Appl. No.: 15/503,114

(22) PCT Filed: Aug. 11, 2015

(86) PCT No.: PCT/CN2015/086658
§ 371 (c)(1),
(2) Date: Feb. 10, 2017

(87) PCT Pub. No.: WO2016/023469
PCT Pub. Date: Feb. 18, 2016

(65) Prior Publication Data
US 2017/0225887 A1    Aug. 10, 2017

(30) Foreign Application Priority Data
Aug. 11, 2014    (CN) .......................... 2014 1 0392142

(51) Int. Cl.
*B65G 53/40* (2006.01)
*B65D 90/54* (2006.01)
(Continued)

(52) U.S. Cl.
CPC ....... *B65D 90/545* (2013.01); *B65D 88/1656* (2013.01); *B65D 90/00* (2013.01);
(Continued)

(58) Field of Classification Search
CPC .. B65D 90/545; B65D 90/54; B65D 88/1656; B65D 90/00; B65D 90/22; B65D 2539/00; F16B 21/186; Y10T 24/309
(Continued)

(56) References Cited

U.S. PATENT DOCUMENTS 2,886,355 A    5/1959    Wurzel
4,074,465 A *  2/1978    Bright ..................... B60J 10/18
                                                            24/297
(Continued)

FOREIGN PATENT DOCUMENTS

CN    202784133    3/2013
CN    203450643    2/2014
(Continued)

OTHER PUBLICATIONS

The extended European search report issued in EP158322362, dated Mar. 3, 2018.
(Continued)

*Primary Examiner* — Greg Binda
(74) *Attorney, Agent, or Firm* — Hamre, Schumann, Mueller & Larson, P.C.

(57) ABSTRACT

A fixing clamp (2) for discharge outlet of intermediate bulk containers is disclosed. The discharge outlet (1) comprises a flange edge (3), a discharge connecting port (5) and a discharge outlet clamping part (4). The discharge outlet clamping part (4) is a polygonal structure. The fixing clamp (2) comprises a fixing clamp body, a clamping portion (8), elastic guiding ribs (7) and anti-release portion (9). A passage for accommodating the discharge outlet clamping part (4) is formed in the middle part of the fixing clamp body. The clamping portion (8) is used for clamping the side surface of the discharge outlet clamping part (4) when the fixing clamp (2) and the discharge outlet (1) have been
(Continued)

assembled. The elastic guiding ribs (7) will be squeezed by the side surface of the discharge outlet clamping part (4) to deform When the leading-in surfaces of the elastic guiding ribs (7) contact with the side surface of the discharge outlet clamping part (4). The elastic guiding ribs (7) restore elastically and the anti-release portion (9) are engaged with the side surface of the discharge outlet clamping part (4) to prevent the fixing clamp (2) from being separated front the discharge outlet (1) after the fixing clamp (2) and the discharge outlet (1) have been assembled. The fixing clamp (2) can be transversely pushed in to be assembled with the discharge outlet (1). The fixing clamp has low requirements for assembly accuracy, and is favorable for saving cost and increasing efficiency.

9 Claims, 19 Drawing Sheets

(51) Int. Cl.
*B65D 90/00* (2006.01)
*B65D 88/16* (2006.01)
*F16B 21/18* (2006.01)
*B65D 90/22* (2006.01)

(52) U.S. Cl.
CPC ............ *B65D 90/54* (2013.01); *F16B 21/186* (2013.01); *B65D 90/22* (2013.01); *B65D 2539/00* (2013.01); *Y10T 24/309* (2015.01)

(58) Field of Classification Search
USPC ................. 285/139.1; 411/522; 406/154
See application file for complete search history.

(56) References Cited

U.S. PATENT DOCUMENTS

| | | | |
|---|---|---|---|
| 4,614,321 A * | 9/1986 | Andre | F16B 5/0685 |
| 4,934,654 A | 6/1990 | Linnemann | |
| 7,188,815 B2 * | 3/2007 | Peterson | F16B 21/088 |
| | | | 24/297 |
| 8,056,193 B2 * | 11/2011 | Park | F16B 5/0614 |
| | | | 24/297 |

FOREIGN PATENT DOCUMENTS

| | | |
|---|---|---|
| CN | 104229343 | 12/2014 |
| DE | 3241464 A1 | 5/1984 |
| DE | 8613607 U1 | 9/1986 |
| EP | 2145833 A1 | 1/2010 |
| WO | 2011044575 | 4/2011 |

OTHER PUBLICATIONS

International Search Report (English and Chinese) and Written Opinion of International Application No. PCT/CN2015/086658, dated Oct. 16, 2015, total 10 pages.

* cited by examiner

FIXING CLAMP FOR DISCHARGE OUTLET OF INTERMEDIATE BULK CONTAINER

FIELD OF THE INVENTION

The present invention relates to the field of logistics and, in particular, to a discharge outlet fixture for intermediate bulk storage containers.

BACKGROUND OF THE INVENTION

Nowadays, large containers are often used for the transport of bulk liquids. The container have a bottom and four side plates. A liner for containing liquid is placed inside the container. The liner placed inside the container are not easily damaged.

Generally, an passage is provided in the side portion at the bottom of the container so as to facilitate the discharge of the liquid in the container. The lower portion of the liner is provided with a discharge outlet. The flange of the discharge outlet and the liner are welded together. The discharge outlet is aligned with the passage in the container when the liner is placed in the container. Most of these discharge outlets do not have their own valves, and the film between the discharge outlet and the interior of the liner is retained. The film is punctured only when the discharge outlet is connected to a pipe equipped with a valve. Some of the discharge outlets are provided with a valve, wherein the discharge channel of the discharge outlet is directly connected to the inside of the liner and the liquid inside of the liner can be discharged simply when the discharge outlet is connected with a tube. Alternatively, when the valve is connected to a tube and opened, the liquid can be discharged.

These discharge outlets have a specific shape, such as a square or hexagonal shape, near the root of the flange which is intended to be connected to a fixing clamp. When the liner is placed in the container, the fixing clamp will firstly snap around the discharge outlet and then snap in the passage at the bottom of the container such that the discharge outlet is secured on the container and the liner is protected from damage in use. However, the existing method of assembling the clamps is that after the welding of the flange, the worker manually twists and fixes the clamp from the mouth of the valve to be mounted on the flange, which is difficult to operate and low in assembling efficiency.

SUMMARY OF THE INVENTION

It is an object of the present invention to provide a fixing clamp which is simple in construction and can be transversely pushed in to be assembled with the discharge outlet, wherein the fixing clamp has low requirements for assembly accuracy, and is favorable for saving cost and increasing efficiency.

In order to achieve the above object, the present invention provides a fixing clamp for discharge outlet of intermediate bulb container, Wherein the intermediate bulk container is provided with a discharge passage, and the fixing clamp is used to fix the discharge outlet in the discharge passage, wherein the discharge outlet comprises a flange edge, a discharge connecting port and a discharge outlet clamping part, wherein the discharge outlet clamping part is a polygonal structure, and the fixing clamp comprises:

a fixing clamp body, wherein an opening is provided at one end of the fixing clamp body, and a passage for accommodating the discharge outlet clamping part is formed in the middle part of the fixing clamp body;

a clamping portion, wherein the clamping portion has a profile forming said passage, and the clamping portion is used for clamping the side surfaces of the discharge outlet clamping part when the fixing clamp and the discharge outlet have been assembled;

elastic guiding ribs, wherein the elastic guiding ribs are provided at the opening end of the fixing clamp body and are connected fixedly to the fixing clamp body with their proximal end, wherein leading-in surfaces are provided on the elastic guiding ribs, and the leading-in surfaces contact with the side surfaces of the discharge outlet clamping part when the fixing clamp is pushed in laterally with respect to the discharge outlet, such that the elastic guiding ribs are deformed due to being squeezed by the discharge outlet clamping part, and the elastic guiding ribs return elastically when the fixing clamp and the discharge outlet have been assembled; and anti-release portions, wherein the anti-release portions are extended integrally from the distal end of the elastic guiding ribs respectively and are provided such that when the fixing clamp and the discharge outlet have been assembled, the anti-release portions are engaged with the side surfaces of the discharge outlet clamping part to prevent the fixing clamp from being separated from the discharge outlet.

Preferably, the anti-release portions are integrally formed With the elastic guiding ribs, and the anti-release portions are provided with anti-release surfaces, wherein when the assembled, the anti-release surfaces abut against the side surfaces of the discharge outlet clamping part to prevent the fixing clamp from being detached from the discharge outlet.

Preferably, the discharge passage of the intermediate bulk container is square in cross-section, and the shape and size of the fixing clamp body are matched to the shape and size of the interior perimeter of the discharge passage.

Preferably, the distal end of the anti-release portion is provided with a position-limiting rib, and the opening end of the clamping portion is provided with a position-limiting step, and the position-limiting step being capable of preventing movement of the anti-release portion in a direction away from said discharge outlet when the position-limiting rib is engaged with the position-limiting step.

Preferably, the anti-release portion is an anti-return hook provided at the distal end of the elastic guiding rib, and an anti-return part is provided on the discharge outlet clamping part correspondingly, wherein when the fixing clamp and the discharge outlet are assembled, the anti-return hook is engaged with the anti-return part so that the fixing clamp can be prevented from being released from the discharge outlet.

Preferably, the clamp body is further provided with an elastic connecting buckle for engaging with the discharge passage of the intermediate bulk container when the fixing clamp is assembled to the discharge outlet, thereby fix the discharge outlet with respect to the discharge passage of the intermediate bulk container.

Preferably, the passage of the fixing clamp is shaped and sized to mate with the discharge outlet clamping part such that the clamping portion engages with the side surfaces of the discharge outlet clamping part tightly.

Preferably, the fixing clamp is made of elastic plastic.

Preferably, the cross-sectional shape of the discharge outlet clamping part of the fixing clamp is quadrilateral or hexagonal.

Preferably, a plurality of said fixing clamps are capable of being stacked on top of each other.

The fixing clamp of present invention can be transversely pushed in to be assembled with the discharge outlet. The fixing clamp has low requirements for assembly accuracy, and is favorable for saving cost and increasing efficiency.

DETAILED DESCRIPTION

Figure 1:
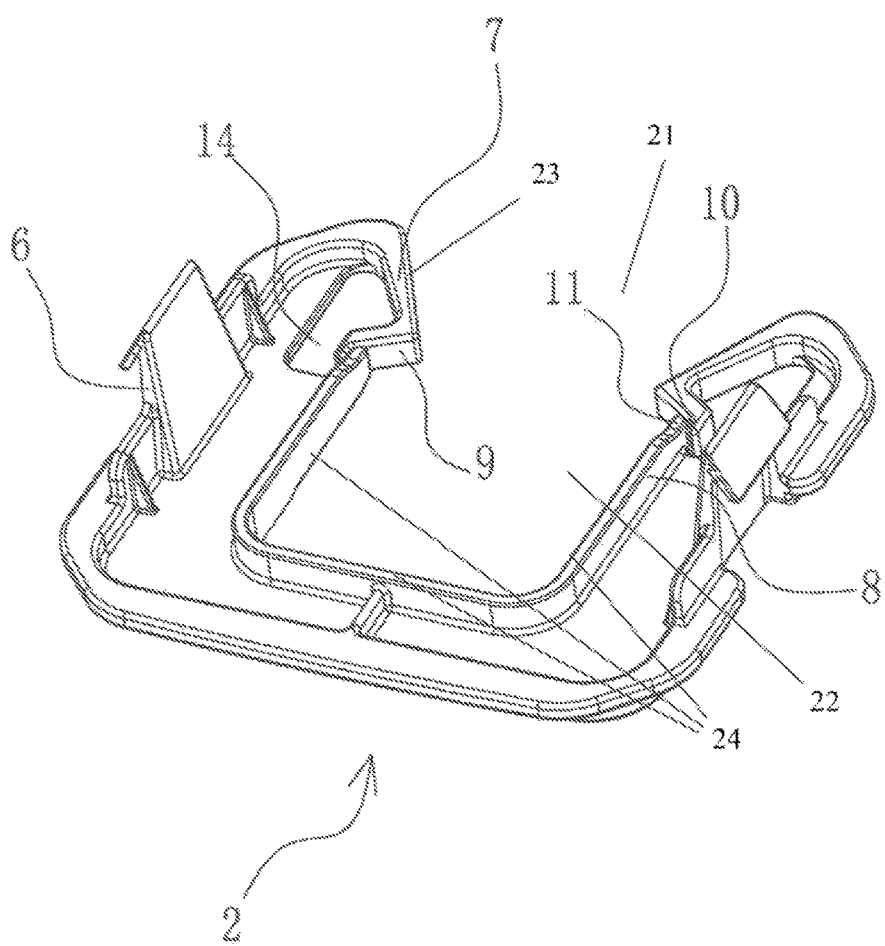
FIG. 1 is a schematic perspective view of a fixing clamp according to first embodiment of the present invention.

Hereinafter, preferred embodiment of the present invention will be described in detail with reference to the drawings, so that the purposes, features and advantages of the present invention will be more clearly understood. It should be understood that the embodiments shown in the drawings are not to limit the scope of the invention, but merely to illustrate the true spirit of the technical solutions of the present invention.

Figure 2:
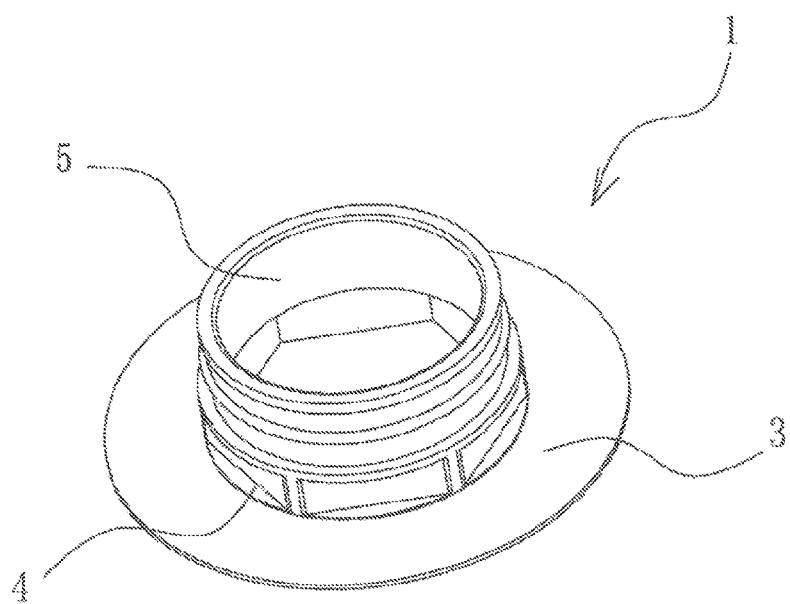
FIG. 2 is a schematic perspective view of a hexagonal discharge outlet.
Figure 3A:
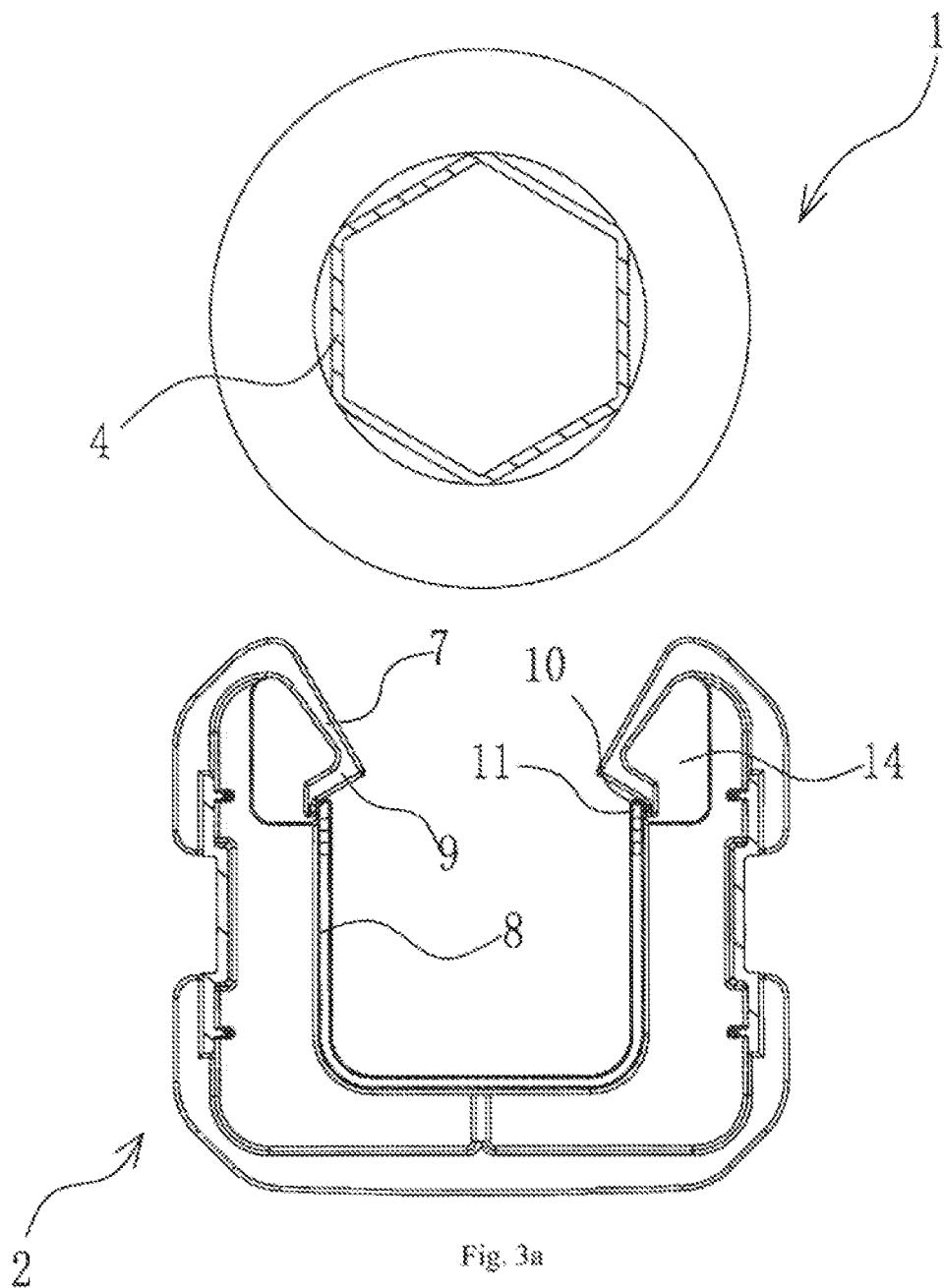
FIGS. 3a-3d are schematic views of a process of assembling the fixing clamp according to the first embodiment of the present invention and a hex-shaped discharge outlet.
Figure 3B:
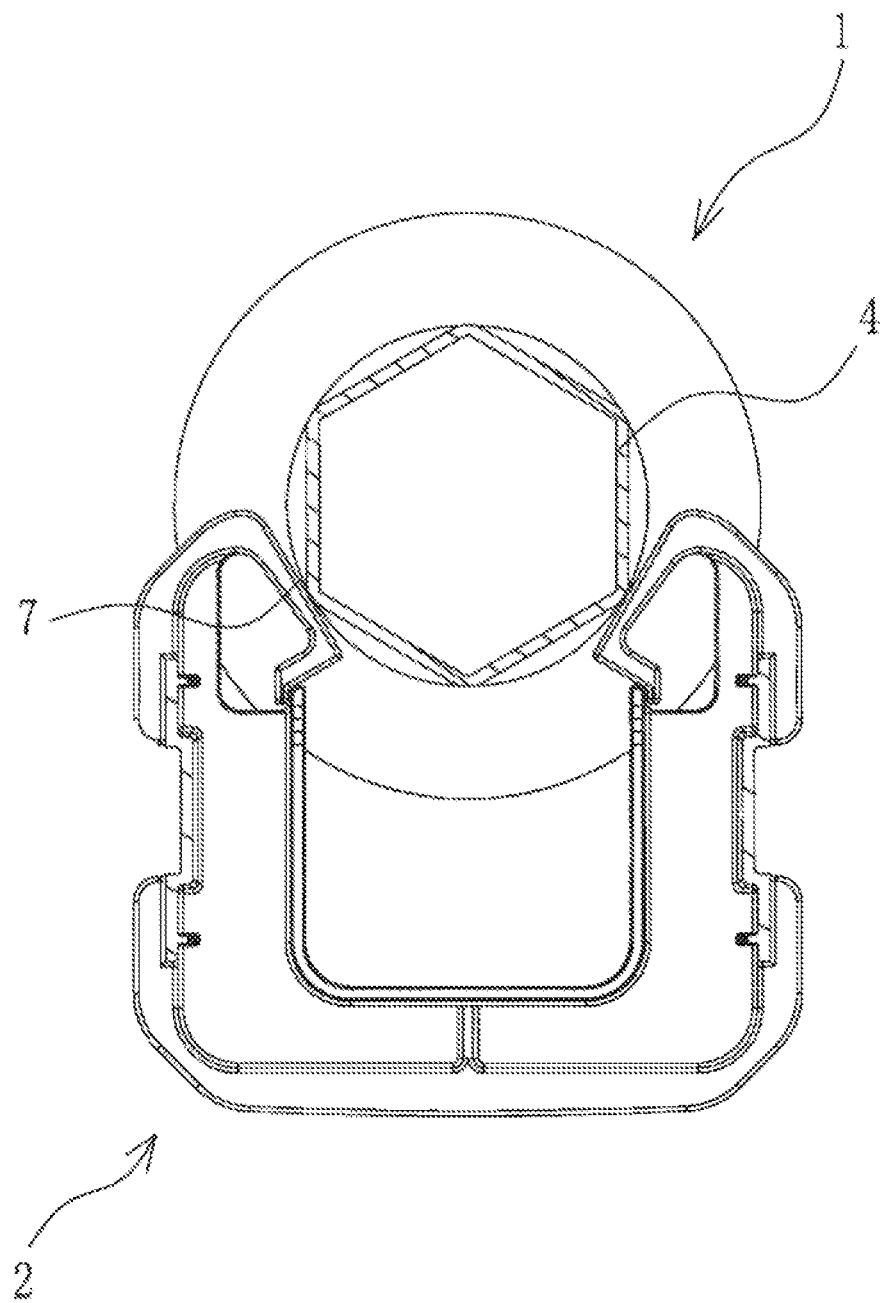
Figure 3C:
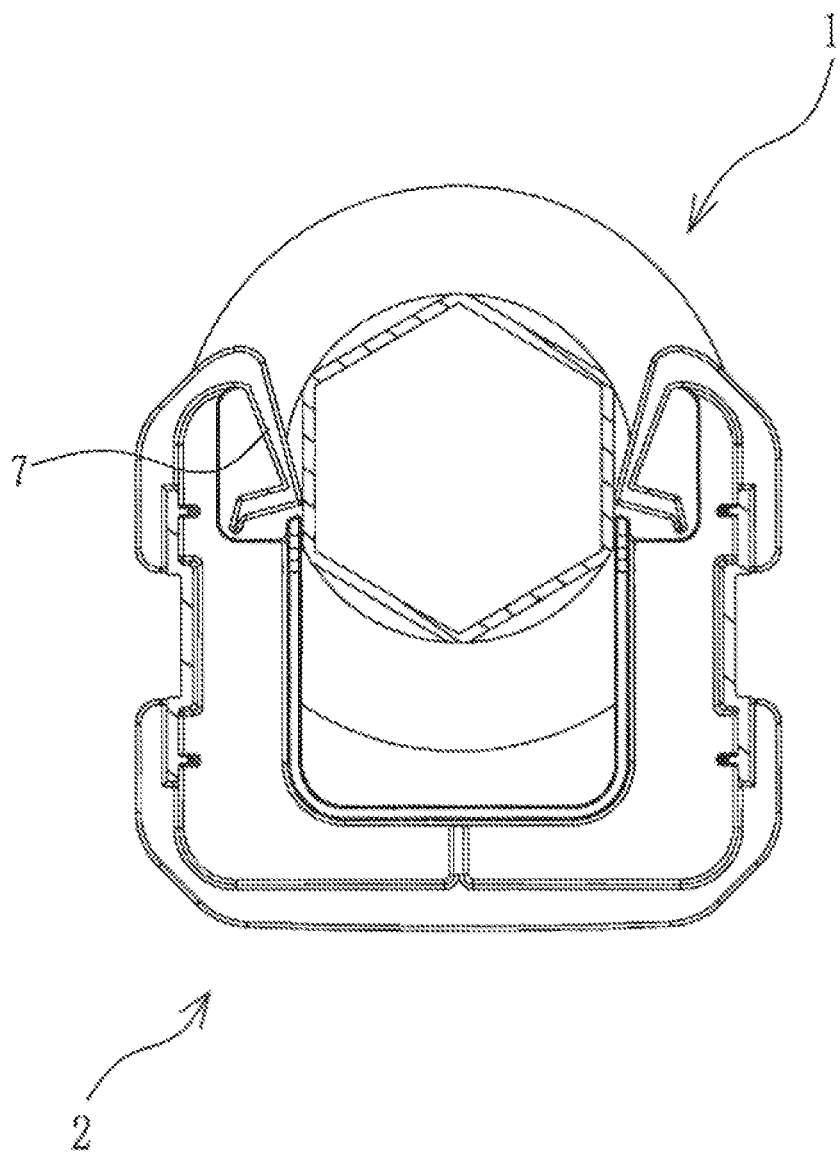
Figure 3D:
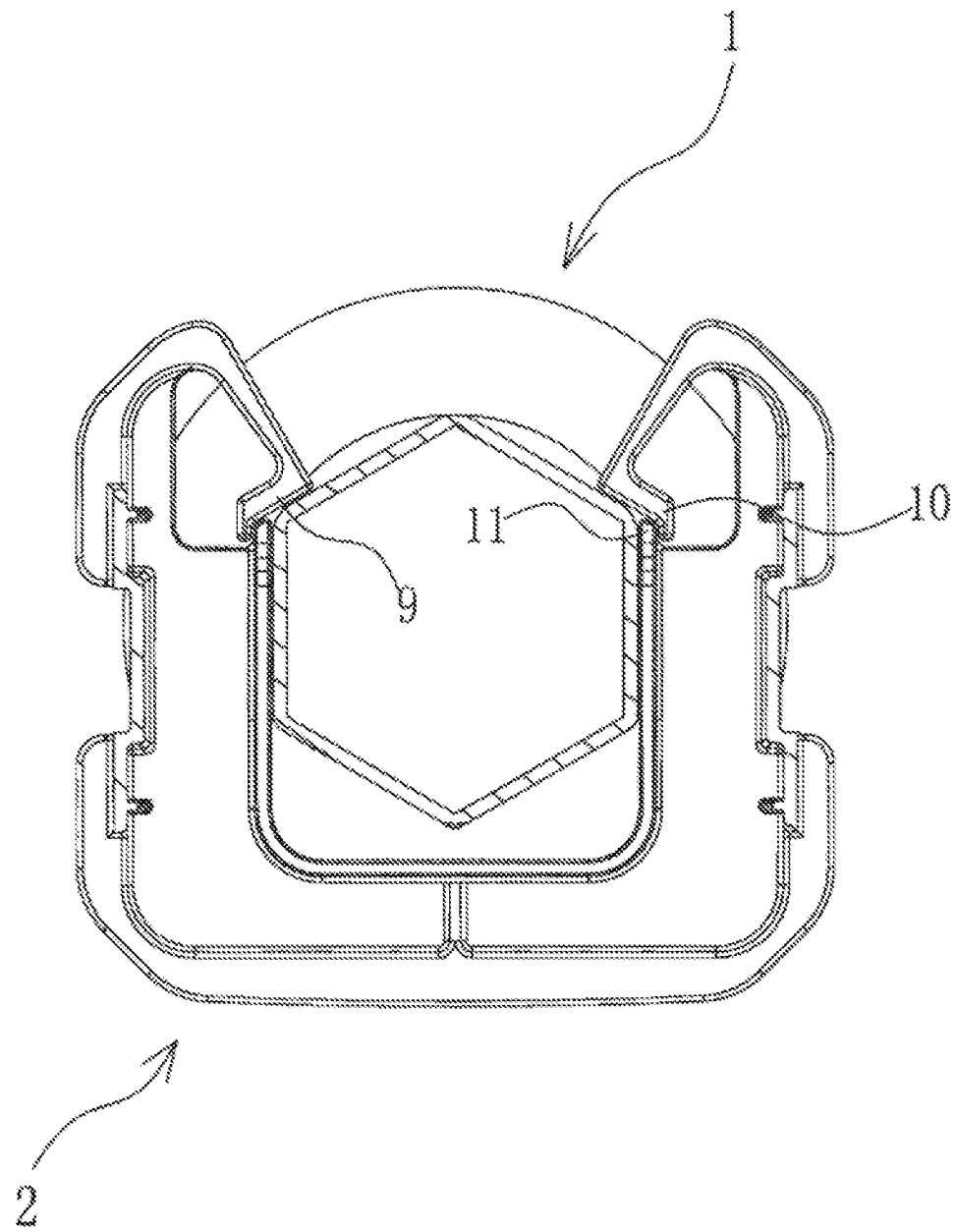

FIG. 1 is a schematic perspective view of a fixing clamp according to a first embodiment of the present invention. FIG. 2 is a schematic perspective view of a hexagonal discharge outlet. As shown in FIGS. 1 and 2, the fixing clamp 2 includes a fixing clamp body, elastic connecting buckle 6, a clamping portion 8, elastic guiding ribs 7, and anti-release portion 9. A position-limiting rib 10 is provided at the distal end of each anti-release portion 9. Position-limiting steps 11 are provided at the top end of the clamping portion 8. An opening 21 is provided at one end of the fixing clamp body, and a passage 22 for accommodating the discharge outlet clamping part is formed in the middle part of the fixing clamp body. The clamping portion 8 has a profile 24 forming said passage 22. The passage 22 of the fixing clamp 2 is shaped and sized to mate with the discharge outlet clamping part such that the clamping portion 8 engages with the side surfaces of the discharge outlet clamping part tightly.

The elastic guiding ribs 7 are provided at the opening end of the fixing clamp body and are connected fixedly to the fixing clamp body with their proximal end. Leading-in surfaces 23 are provided on the elastic guiding ribs 7 respectively.

The anti-release portions 9 are extended integrally from the distal ends of the elastic guiding ribs 7 and are provided such that when the fixing clamp 2 and the discharge outlet have been assembled, the anti-release portions 9 are engaged with the side surfaces of discharge outlet clamping part to prevent the fixing clamp 2 from being separated from the discharge outlet.

The hexagonal discharge outlet comprises a flange edge 3, a discharge outlet clamping part 4, and a discharge connecting port 5.

The clamp is generally made of a plastic material, and the clamp is constructed so that a plurality of fixing clamps can be stacked together.

The elastic connecting buckle 6 is adapted to cooperate with the discharge passage at the bottom of the intermediate bulk container so that the discharge outlet is fixed relative to the container. The discharge passage of the intermediate bulk container is generally square. Therefore, the shape of the fixing clamp body is also square so as to match the discharge passage. The elastic connecting buckle 6 is a plastic elastic member. It will be deformed due to elasticity and contact with a corresponding portion of the discharge passage so as to be installed.

The fixing clamp 2 of the present invention can be pushed laterally to be assembled with the discharge outlet. The elastic guiding rib is made of an elastic plastic material. The elastic guiding rib 7 is pressed to be deformed and rotated into a groove 14 during pushing in. When assembled, the clamping portion 8 can clamp the hexagonal clamping part 4 tightly, thereby fixing the discharge outlet 1 so that it cannot move up, down, left or right with respect to the fixing clamp 2.

The distal end of the elastic guiding rib 7 is connected to the anti-release portion 9. When the fixing clamp 2 is assembled to the discharge outlet 1, the anti-release portion 9 can be positioned against the discharge outlet clamping part to prevent the fixing clamp from being disengaged from the discharge outlet.

FIGS. 3a-3d are schematic views of a process of assembling the fixing clamp according to the first embodiment of the present invention and a hex-shaped discharge outlet. When assembling, the fixing clamp is moved in parallel with the discharge outlet. After the guiding surface of the elastic guiding rib 7 is brought into contact with the discharge outlet clamping part 4 (see FIG. 3b), the fixing clamp 2 is pushed further, and the elastic guiding rib 7 will be squeezed by the discharge outlet clamping part 4 to be deformed and be rotated into a groove 14 (see FIG. 3c, and see FIG. 1 for the groove 14). When the fixing clamp 2 and the discharge outlet 1 are assembled in place (see FIG. 3d), the elastic guiding ribs 7 of the fixing clamp 2 will be restored due to not being squeezed anymore. Then, the clamping portion 8 of the fixing clamp clamps the discharge outlet clamping part 4, and the anti-release surfaces of the anti-release portions 9 connected to the distal ends of the elastic guiding rib 7 are engaged with the side surfaces of the discharge outlet clamping part to prevent the fixing clamp from being released from the discharge outlet.

Figure 4:
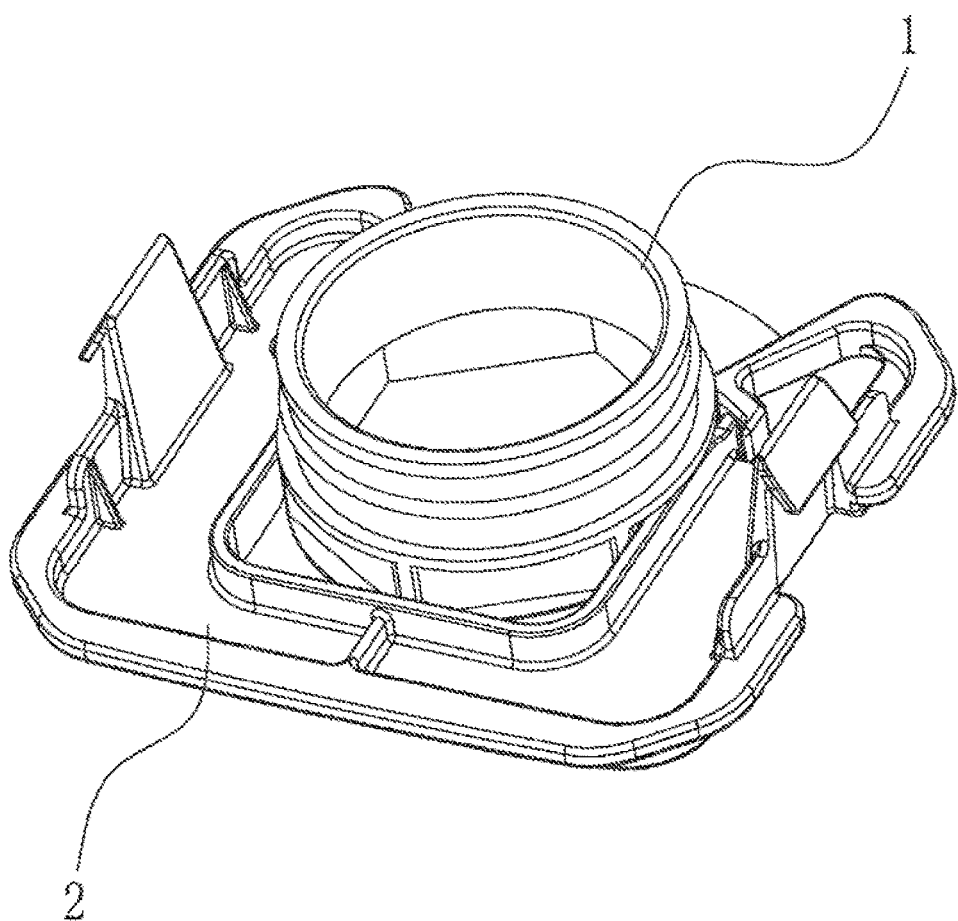
FIG. 4 is a schematic perspective view of the fixing clamp according to the first embodiment of the present invention and the hexagonal discharge outlet when assembled.

FIG. 4 is a schematic perspective view of the fixing clamp according to the first embodiment of the present invention and the hexagonal discharge outlet when assembled. When the fixing clamp and the discharge outlet are assembled, the discharge outlet integrally assembled with the fixing clamp are fixed to the discharge passage at the bottom of the intermediate bulk container through the elastic connecting buckle 6 so that the discharge outlet does not shake with respect to the discharge passage. It helps to reduce damage to the discharge outlet.

It is to be noted that, as shown in the drawings, the fixing clamp of the present invention is provided with a position-limiting rib 10 at the distal end of the anti-release portion 9 and a position-limiting step 11 is provided at the top end of the clamping portion 8. If the fixing clamp is subjected to a force in the direction away from the discharge outlet during installation and transportation, an interaction force generated between the side surface of the discharge outlet and the anti-release portion 9 may cause the elastic guiding rib 7 to be moved away from the groove 14 and damaged or cause the fixing clamp to be released from the discharge outlet. However, if the elastic guiding ribs 7 are strong enough, it is not necessary to provide the position-limiting rib 10 and the position-limiting steps 11.

Figure 5:
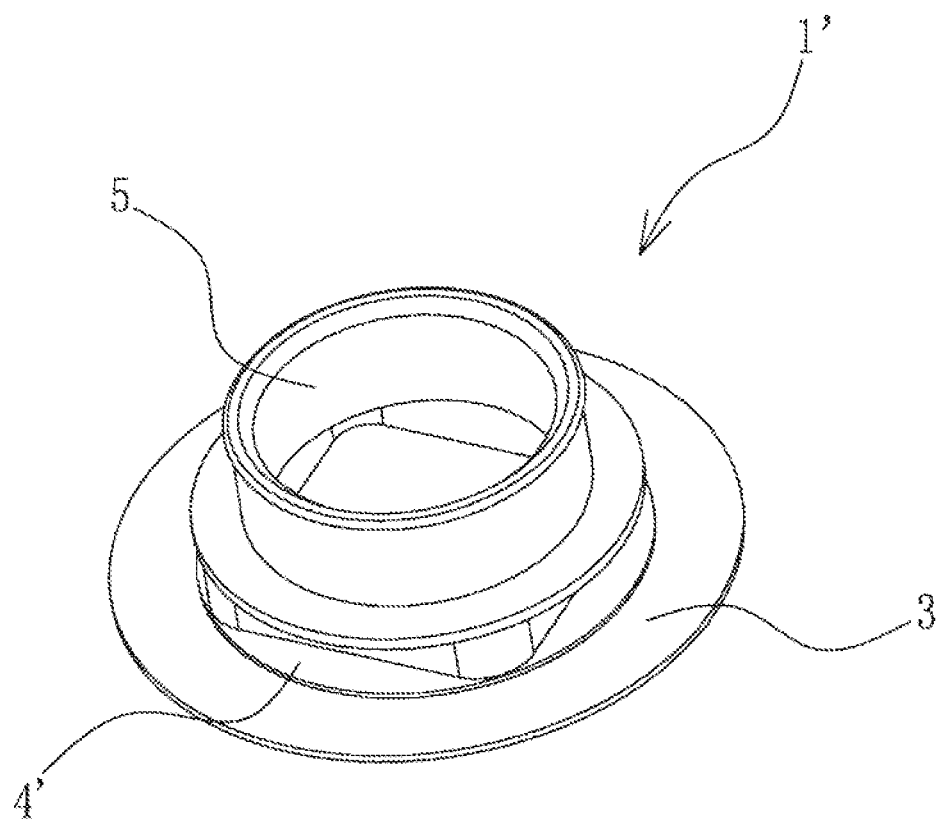
FIG. 5 is a schematic perspective view of a quadrilateral discharge outlet.
Figure 6A:
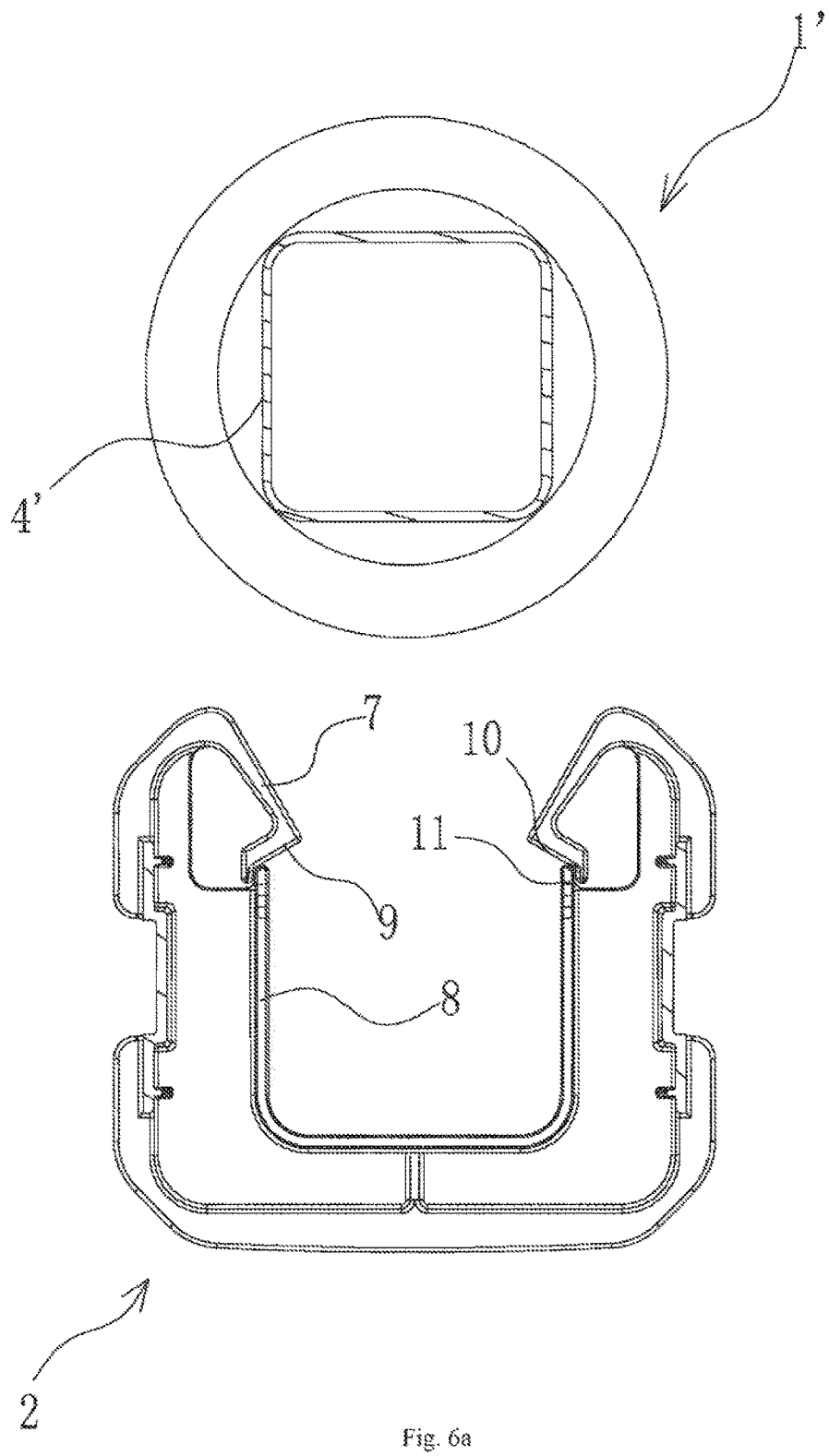
FIGS. 6a-6d are schematic views of a process of assembling the fixing clamp according to the first embodiment of the present invention and a quadrilateral discharge outlet.
Figure 6B:
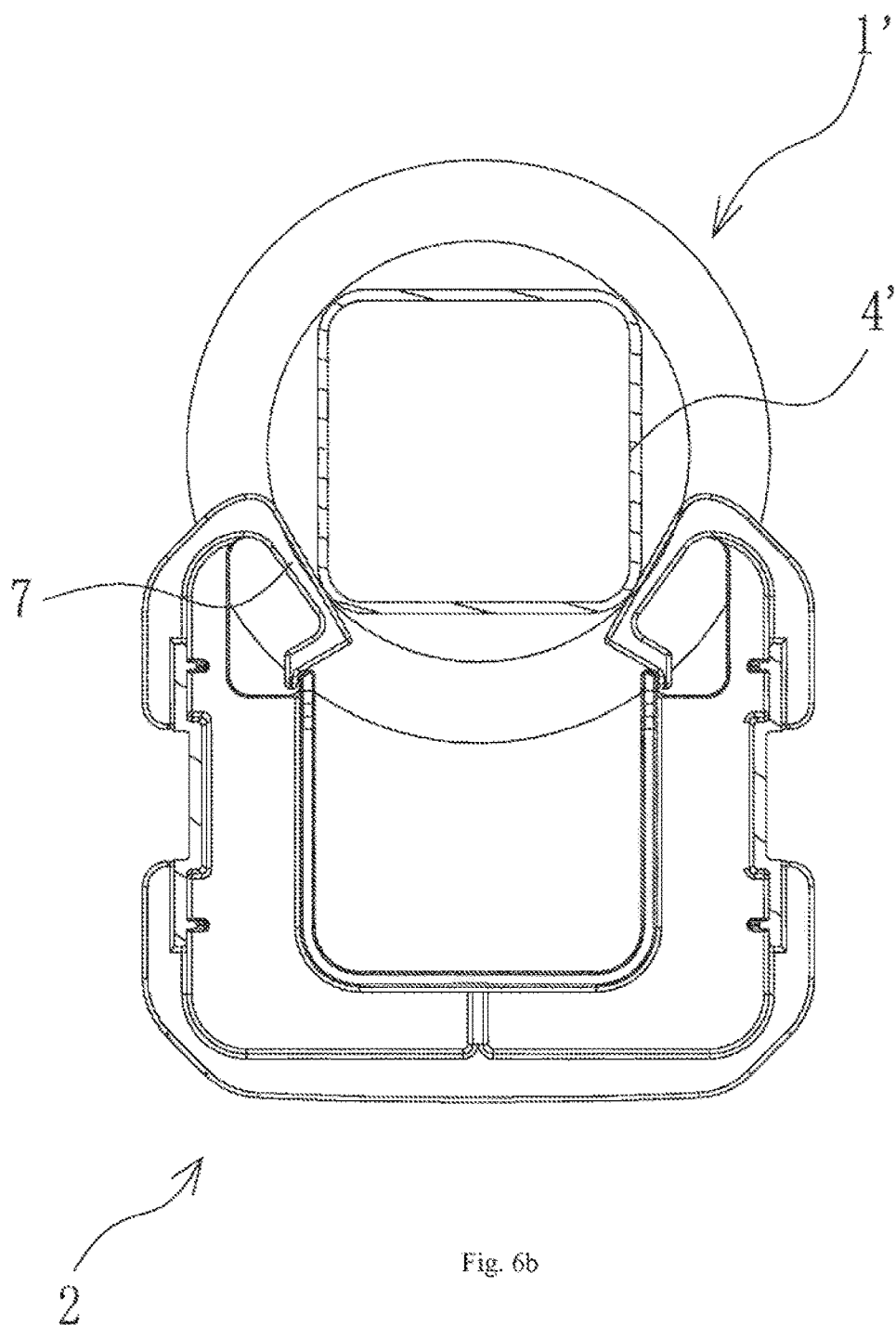
Figure 6C:
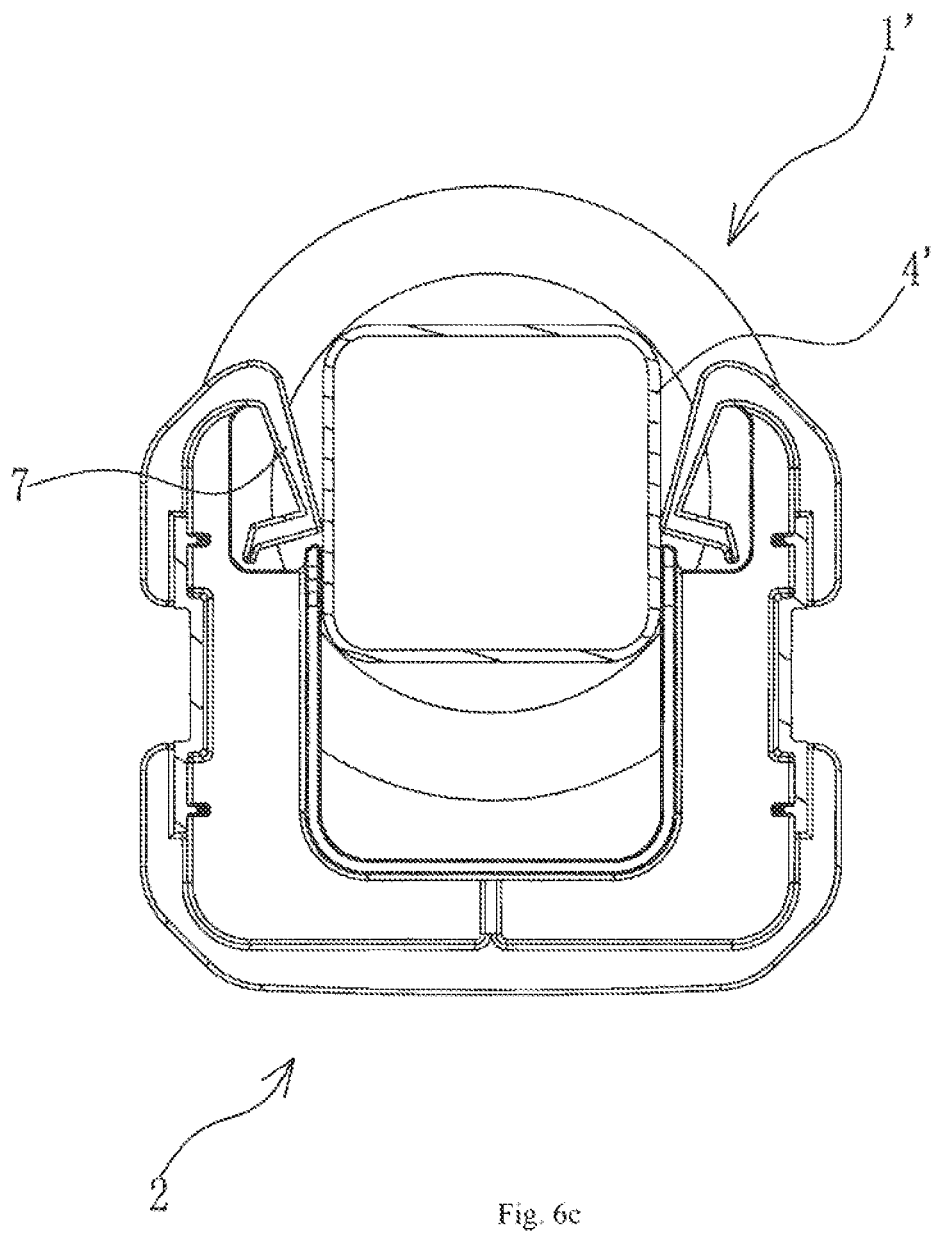
Figure 6D:
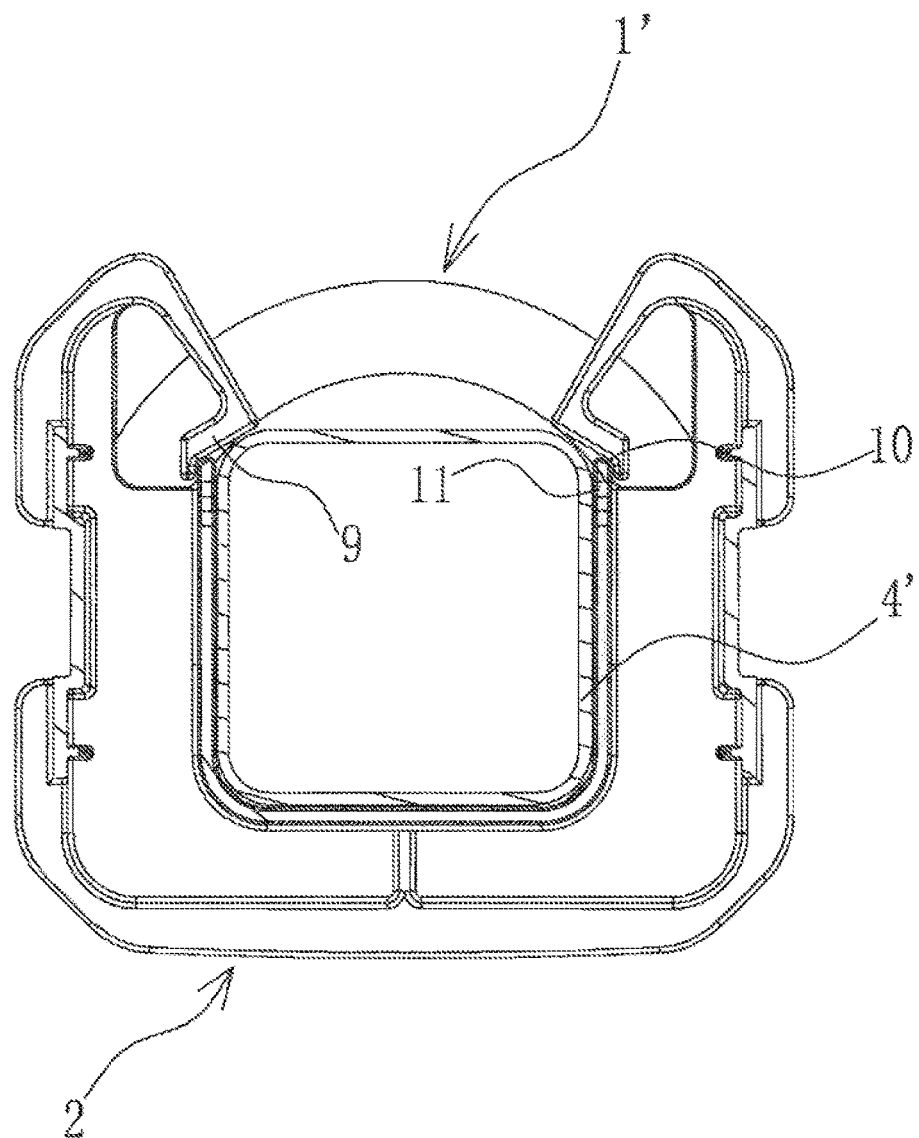
Figure 7:
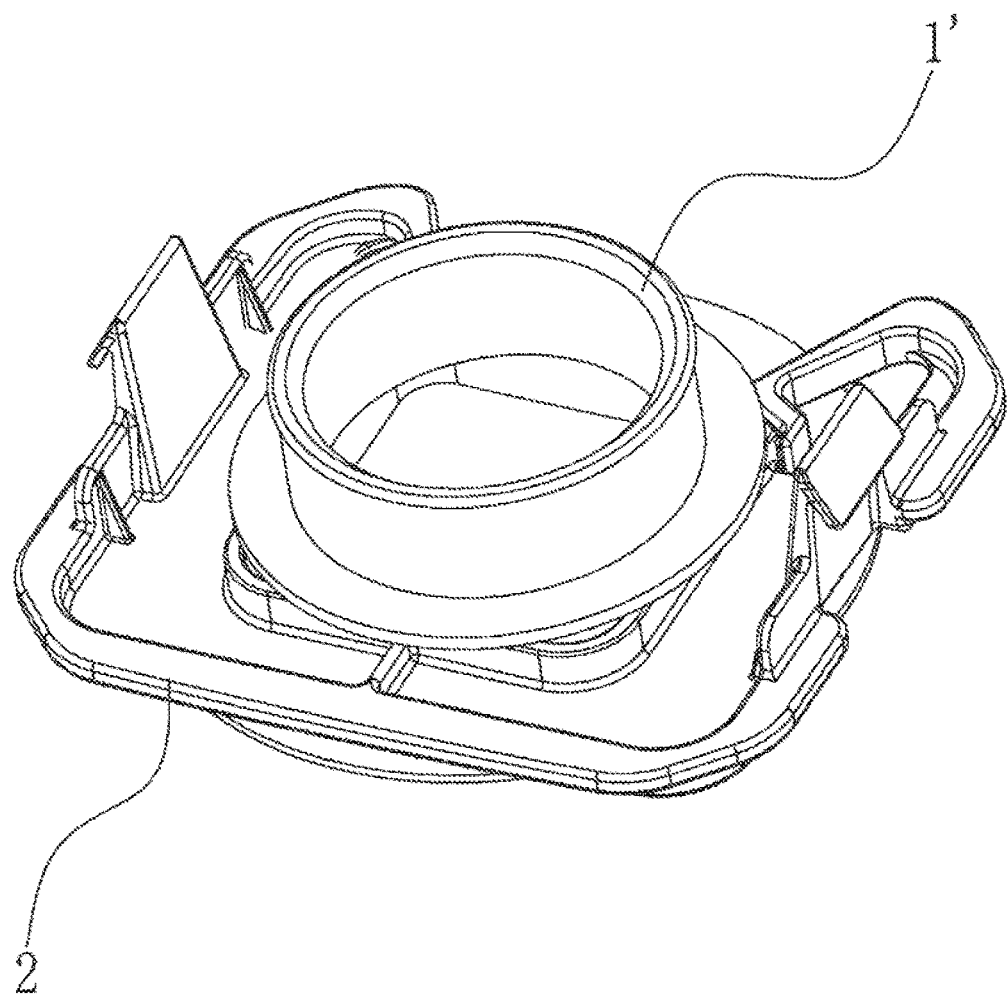
FIG. 7 is a schematic perspective view of the fixing clamp according to the first embodiment of the present invention and the quadrangular discharge outlet when assembled.

The discharge outlet clamping part of the discharge outlet 1' in FIG. 5 has a quadrangular shape. The clamping clamp according to the first embodiment of the present invention can also be used to fix the quadrilateral discharge outlet in FIG. 5. FIGS. 6a-6d are schematic views of a process of assembling clamps in accordance with the first embodiment of the present invention and quadrilateral discharge outlets. FIG. 7 is a schematic perspective view of the fixing clamp according to the first embodiment of the present invention and the quadrangular discharge outlet when assembled. The assembling process thereof is almost identical to the assembly of the hex-shaped discharge outlet and fixing clamp. The corners of the quadrangular clamping portion are rounded so as to better be engaged with the anti-release portion 9.

Figure 8:
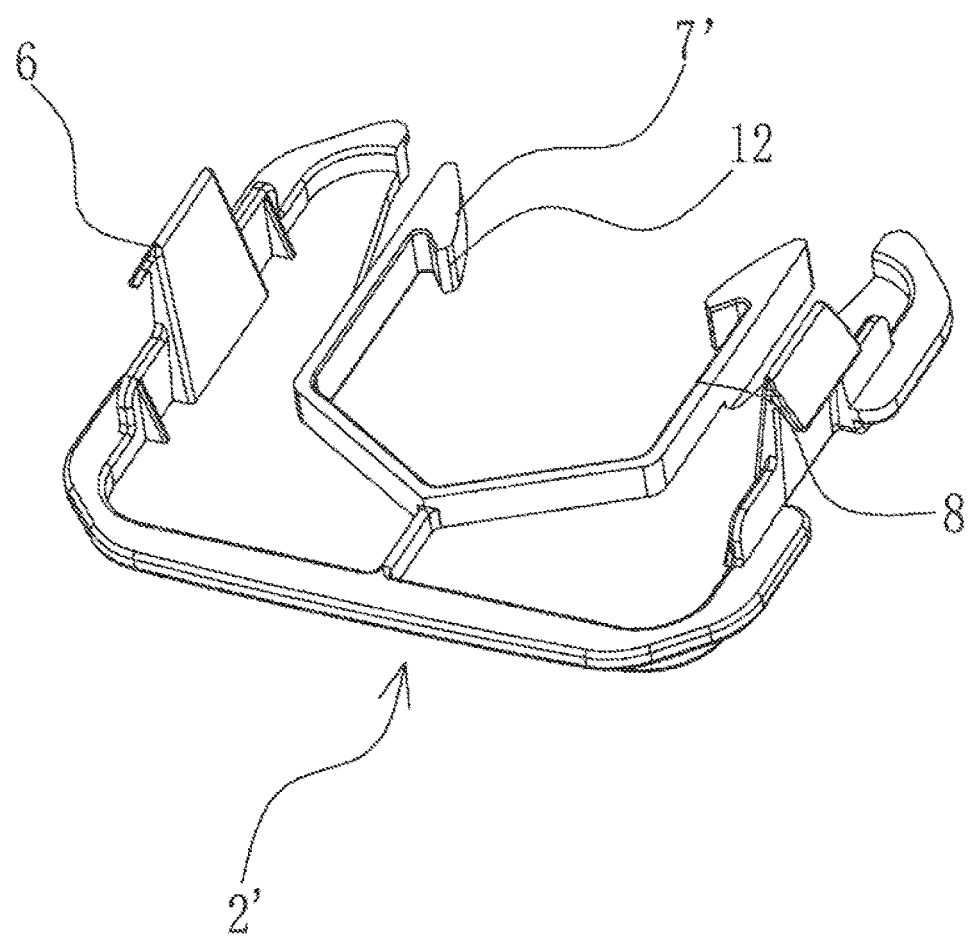
FIG. 8 is a schematic perspective view of a fixing clamp according to a second embodiment of the present invention.
Figure 9:
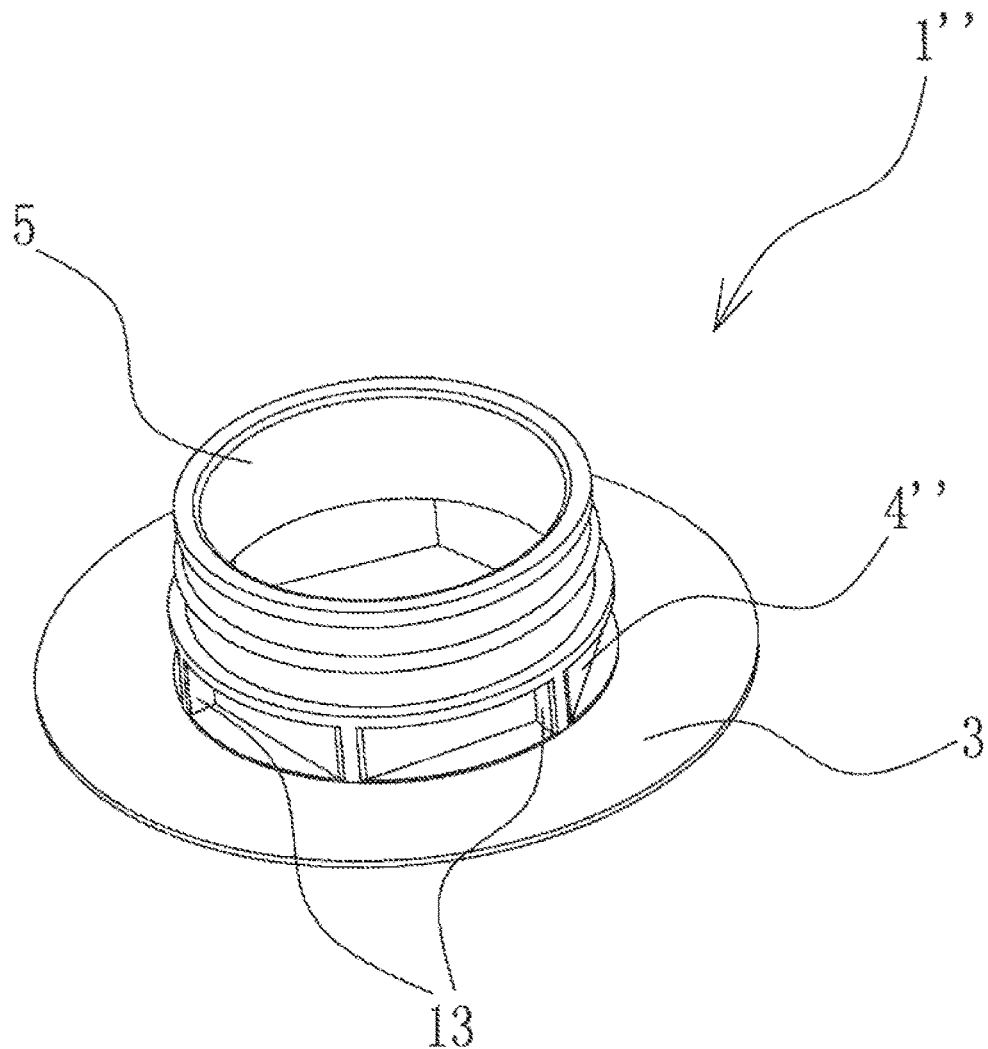
FIG. 9 is a schematic perspective view of a discharge outlet provided with an anti-return part.

FIG. 8 is a schematic structural view of a fixing clamp according to a second embodiment of the present invention. As shown in FIG. 8, the fixing clamp 2' includes a fixing clamp body, an elastic connecting buckle 6, a clamping portion 8, and an elastic guiding rib 7'. An anti-return hook 12 is provided at an end of the elastic guiding rib 7'. The fixing clamp of the present embodiment is adapted to be used with a discharge outlet having an anti-return part (see FIG. 9). As shown in FIG. 9, the discharge outlet 1'' differs from the hexagonal discharge outlet in FIG. 2 in that an anti-return part 13 is provided at the discharge outlet clamping part 4''. When the fixing clamp and the discharge outlet of the present embodiment are assembled, the anti-return hook 12 is engaged with the anti-return part 13, so that the fixing clamp and the discharge outlet can be prevented from being released.

Figure 10A:
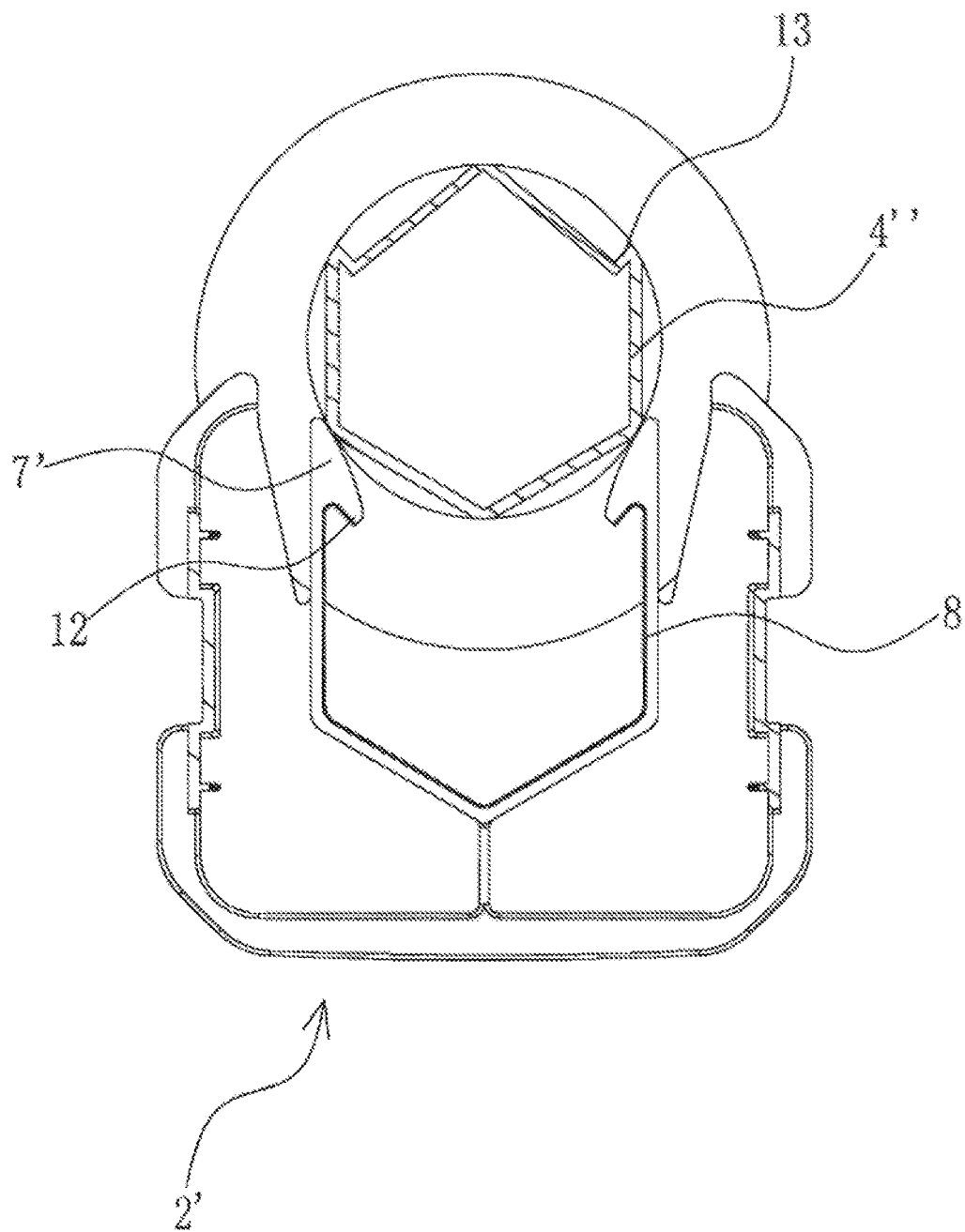
FIGS. 10a to 10c are schematic views of an process of assembling the fixing clamp according to the second embodiment of the present invention and the discharge outlet provided with the anti-return part.
Figure 10B:
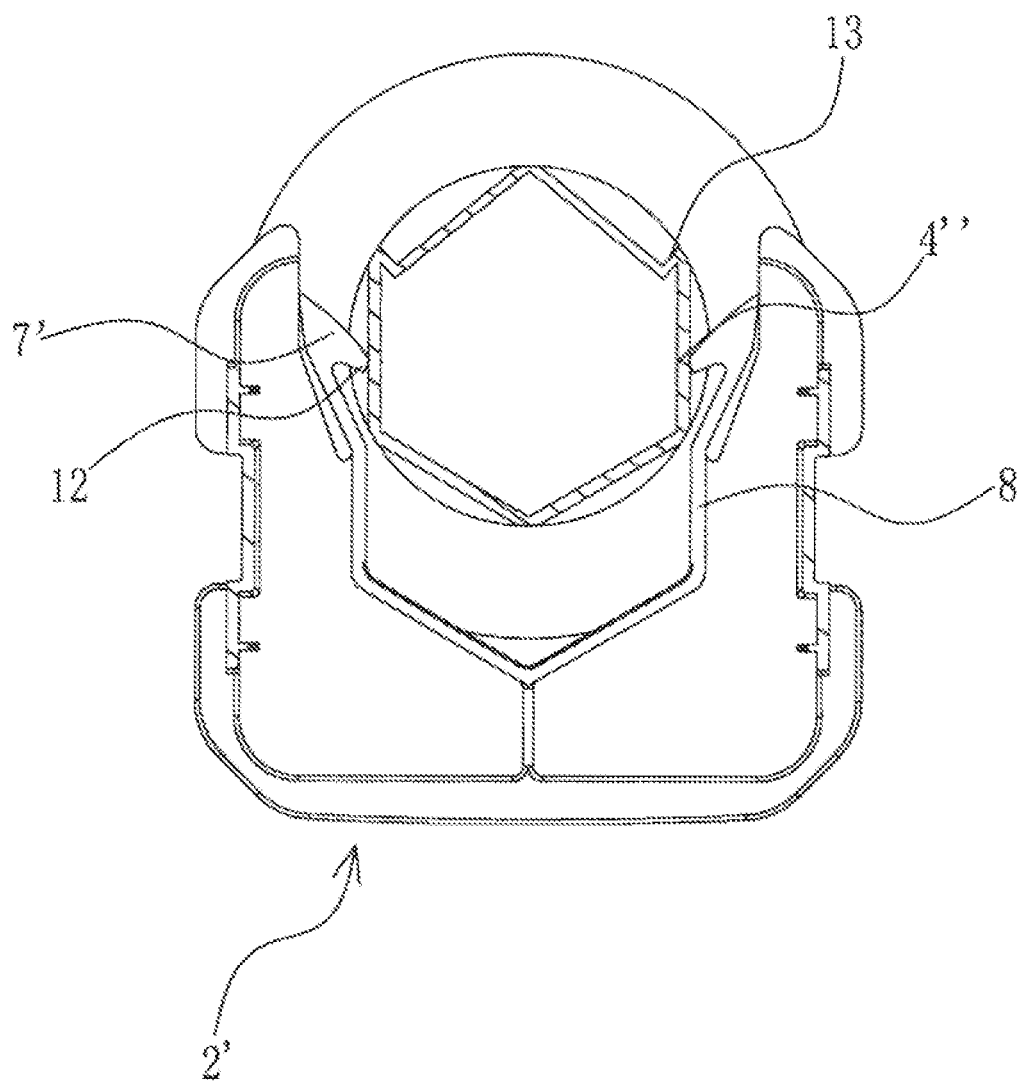
Figure 10C:
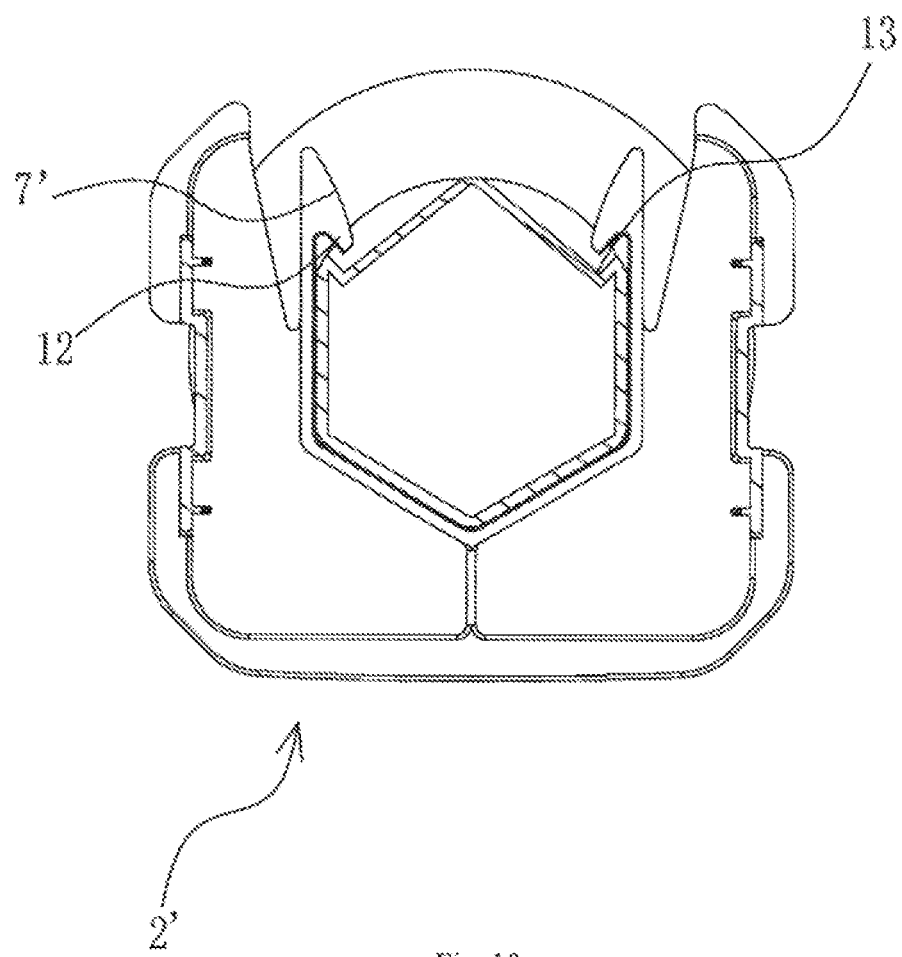
Figure 11:
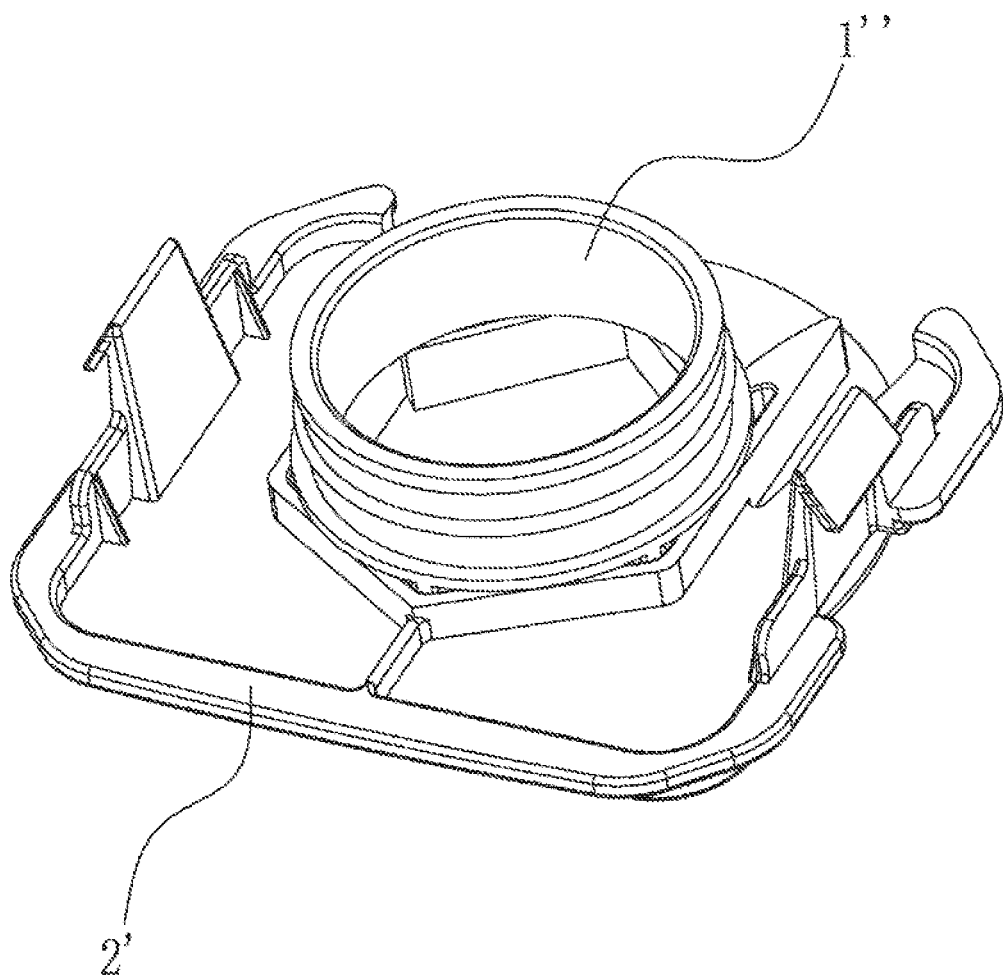
FIG. 11 is a schematic perspective view of the fixing clamp according to the second embodiment of the present invention when assembled with a discharge outlet provided with a anti-return part.

FIGS. 10a to 10c are schematic views of an process of assembling the fixing clamp according to the second embodiment of the present invention and the discharge outlet provided with the anti-return part. FIG. 11 is a schematic perspective view of the fixing clamp according to the second embodiment of the present invention when assembled with a discharge outlet provided with a anti-return part. When assembling, the fixing clamp 2' is moved in parallel with the discharge outlet 1''. After the elastic guiding rib 7' is brought into contact with the discharge outlet clamping part 4'' (see FIG. 10a), the fixing clamp 2' is pushed further, and the elastic guiding rib 7' will be squeezed by the discharge outlet clamping part 4'' to be deformed. When the fixing clamp 2' and the discharge outlet are assembled in place (see FIG. 10c), the elastic guiding ribs of the fixing clamp will be restored due to not being squeezed anymore. Then, the clamping portion 8 of the fixing clamp clamps the discharge outlet clamping part 4, and the anti-return hook 12 is engaged with the anti-return part 13 to prevent the fixing clamp from being released from the discharge outlet.

Preferably, the clamping portion may be shaped to match the shape of the discharge outlet clamping part for better engagement of the clamping portion with the discharge outlet clamping part. However, a fixing clamp having a particular clamping portion may also be used for discharge outlets having different shapes of the clamping part as long as the fixing clamp can keep the discharge outlet fixed.

When it is necessary to remove the fixing clamp from the discharge outlet, the elastic guiding ribs can be squeezed outward manually and deformed such that the anti-release portion disengages from the side structure of the claiming part. Then, the fixing clamp can be pulled away from the discharge out.

The fixing clamp can be transversely pushed in to be assembled with the discharge outlet. The fixing clamp has low requirements for assembly accuracy, and is favorable for saving cost and increasing efficiency.

Preferred embodiments of the present invention has been described in detail hereinbefore, but it is to be understood that, after reading the above teachings of the present invention, those skilled in the art may make various modifications or amendments to the present invention. These equivalent forms also fall into the scope limited by appended claims of the present application.

What is claimed is:

1. A fixing clamp for a discharge outlet of an intermediate bulk container, wherein the intermediate bulk container is provided with a discharge passage, and the fixing clamp is used to fix the discharge outlet in the discharge passage, wherein the discharge outlet comprises a flange edge, a discharge connecting port and a discharge outlet clamping part, wherein the discharge outlet clamping part is a polygonal structure, and the fixing clamp comprises:

a fixing clamp body, wherein an opening is provided at one end of the fixing clamp body, and a passage for accommodating the discharge outlet clamping part is formed in the middle part of the fixing clamp body;

a clamping portion, wherein the clamping portion has a profile forming said passage, and the clamping portion is used for clamping the side surfaces of the discharge outlet clamping part when the fixing clamp and the discharge outlet have been assembled;

elastic guiding ribs, wherein the elastic guiding ribs are provided at the opening end of the fixing clamp body and are connected fixedly to the fixing clamp body with their proximal end, wherein leading-in surfaces are provided on the elastic guiding ribs, and the leading-in surfaces contact with the side surfaces of the discharge outlet clamping part when the fixing clamp is pushed in laterally with respect to the discharge outlet, such that the elastic guiding ribs are deformed due to being squeezed by the discharge outlet clamping part, and the elastic guiding ribs return elastically when the fixing clamp and the discharge outlet have been assembled; and anti-release portions, wherein the anti-release portions are extended integrally from the distal ends of the elastic guiding ribs respectively and are provided such that when the fixing clamp and the discharge outlet have been assembled, the anti-release portions are engaged with the side surfaces of the discharge outlet clamping part to prevent the fixing clamp from being separated from the discharge outlet.

2. The fixing clamp according to claim 1, wherein the anti-release portions are provided with anti-release surfaces, wherein when the assembled, the anti-release surfaces abut against the side surfaces of the discharge outlet clamping part to prevent the fixing clamp from being detached from the discharge outlet.

3. The fixing clamp according to claim 2, wherein the distal end of the anti-release portion is provided with a position-limiting rib, and the opening end of the clamping portion is provided with a position-limiting step, and the position-limiting step being capable of preventing movement of the anti-release portion in a direction away from said discharge outlet when the position-limiting rib is engaged with the position-limiting step.

4. The fixing clamp according to claim 1, wherein the discharge passage of the intermediate bulk container is square in cross-section, and the shape and size of the fixing clamp body are matched to the shape and size of the interior perimeter of the discharge passage.

5. The fixing clamp according to claim 1, wherein the anti-release portion is an anti-return hook provided at the distal end of the elastic guiding rib, and an anti-return part is provided on the discharge outlet clamping part correspondingly, wherein when the fixing clamp and the discharge outlet are assembled, the anti-return hook is engaged with the anti-return part so that the fixing clamp can be prevented from being released from the discharge outlet.

6. The fixing clamp according to claim 1, wherein the clamp body is further provided with an elastic connecting buckle for engaging with the discharge passage of the intermediate bulk container when the fixing clamp is assembled to the discharge outlet, thereby fix the discharge outlet with respect to the discharge passage of the intermediate bulk container.

7. The fixing clamp according to claim 1, wherein the passage of the fixing clamp is shaped and sized to mate with the discharge outlet clamping part such that the clamping portion engages with the side surfaces of the discharge outlet clamping part tightly.

8. The fixing clamp according to claim 1, wherein the fixing clamp is made of elastic plastic.

9. The fixing clamp according to claim 1, wherein the cross-sectional shape of the discharge outlet clamping part of the fixing clamp is quadrilateral or hexagonal.

* * * * *